United States Patent

[11] 3,555,180

[72] Inventor Melvin S. Cook
Hewlett Harbor, N.Y.
[21] Appl. No. 616,861
[22] Filed Feb. 17, 1967
[45] Patented Jan. 12, 1971
[73] Assignee Se‌i ·o Corporation of America
Hicksville, N.Y.
a corporation of New York

[54] SEMICONDUCTOR DETECTOR AND SCANNING DEVICE
11 Claims, 7 Drawing Figs.

[52] U.S. Cl. 178/7.1, 250/211
[51] Int. Cl. H04n 5/30
[50] Field of Search 178/6.8, 7.1, 7.2, 6NS; 250/211J, 211R; 325/473, 483; 329/145; 343/100.7

[56] References Cited
UNITED STATES PATENTS
2,684,468 7/1954 McClure et al. 333/70
3,111,556 11/1963 Knoll et al. 178/7.1
OTHER REFERENCES
RCA Technical Note No. 494 September 1961, Single back " Circuit For Improving Signal to Noise Ratio".

*Primary Examiner*—Robert L. Griffin
*Assistant Examiner*—Robert L. Richardson
*Attorney*—Kane, Dalsimer, Kane, Sullivan & Kurcz ABSTRACT: This invention employs a radiation detection device including semiconductor material positioned to receive radiation. The radiation releases free carriers and a scanning voltage drives the carriers to a collector. Synchronizing means and a recirculating delay line control the scanning voltage and provide improved signal to noise properties.

INVENTOR.
MELVIN S. COOK
BY
Hopgood & Calimafde
ATTORNEYS

INVENTOR.
MELVIN S. COOK
BY
Hopgood & Calimafde
ATTORNEYS

INVENTOR.
MELVIN S. COOK

BY
Hopgood & Calimafde
ATTORNEYS.

INVENTOR.
MELVIN S. COOK

BY

Hopgood & Calimafde

ATTORNEYS

SEMICONDUCTOR DETECTOR AND SCANNING DEVICE

This invention relates to signal processing of varying voltages or currents developed by scanning circuits acting on image pickup devices which are responsive to electromagnetic radiation patterns, with particular reference to the type of devices referred to in U.S. Pat. No. 3,111,556 (Nov. 19, 1963). The invention can be used in any radar, television, facsimile, or other image detection or reproduction system, but it is particularly useful in systems for the detection and tracking of such objects as missiles and stars.

The invention described in U.S. Pat. No. 3,111,556 has been found to sometimes be subject to serious limitations due to various random noise sources acting to degrade the signal-to-noise characteristics of the information derived from scanning circuits acting on the photosensitive element. Accordingly, one object of the present invention is to provide circuitry capable of improving the signal-to-noise properties of the information derived from the scanning of the photosensitive element. Another object of the present invention is to provide a means of more accurately localizing radiation impinging on the photosensitive element. Another object of the present invention is to more accurately measure the intensity of radiation impinging on the photosensitive element. The invention can provide any or all of the above functions described as objects of the invention. Another object of the invention is to provide a rugged sensor operated at reasonably low voltage levels as compared to vidicons or to photomultipliers. Another advantage is to provide a sensor without any associated moving mechanical parts such as moving slits.

Other objects of the present invention will become apparent to those skilled in the art from the following description of several embodiments as illustrated in the attached drawings, in which:

FIG. 1 is a block diagram of one illustrative image pickup device and one illustrative scanning circuit of the invention described in U.S. Pat. No. 3,111,556 used in conjunction with the present invention also illustrated in FIG. 1.

As discussed in U.S. Pat. No. 3,111,556, the operation of the photosensitive sensor itself is based upon well known properties of semiconductor materials. Minority carriers can be generated in semiconductor and doped semiconductor materials by directing a beam of radiation on these materials. The beam of radiation excites minority carriers at given points. These minority carriers are generated with a spatial distribution in proportion to the intensity of the incident radiation. The sensor incorporated in the present invention requires that these minority carriers persist long enough to be driven through the semiconductor material by means of a voltage gradient in the semiconductor material. Near one end of the semiconductor strip is a collector electrode. In operation, the minority carriers give rise to a modulation of the collector current. The transit time required from the time of application of a voltage to the semiconductor strip to the time the carriers generated at a particular point gave rise to a modulation of the collector current allows one to determine at what point on the strip these carriers were generated.

It has been found that under certain circumstances the carrier concentration, resolution, mobility, and noise level of these radiation-excited carriers are of such nature as to permit a faithful reproduction of the radiation pattern incident on the entire semiconductor strip. However, under other circumstances, this may be difficult to detect using the art delineated in U.S. Pat. No. 3,111,556.

The present invention enables one to detect signals in situations where there is a significant amount of random noise which tends to obscure the information one wishes to obtain. The present invention also enables one to more accurately localize the point of origin of minority carriers modulating the collector current. Further, the present invention allows one to measure quite accurately the intensity of the source of radiation.

These benefits can be obtained primarily when the information density of the radiation incident on the photosensitive element (semiconductor strip) is not high. A possible situation where these capabilities are important and these limitations acceptable would be detection of stars by a navigation system, for example.

SIGNAL DETECTION

Figure 1:
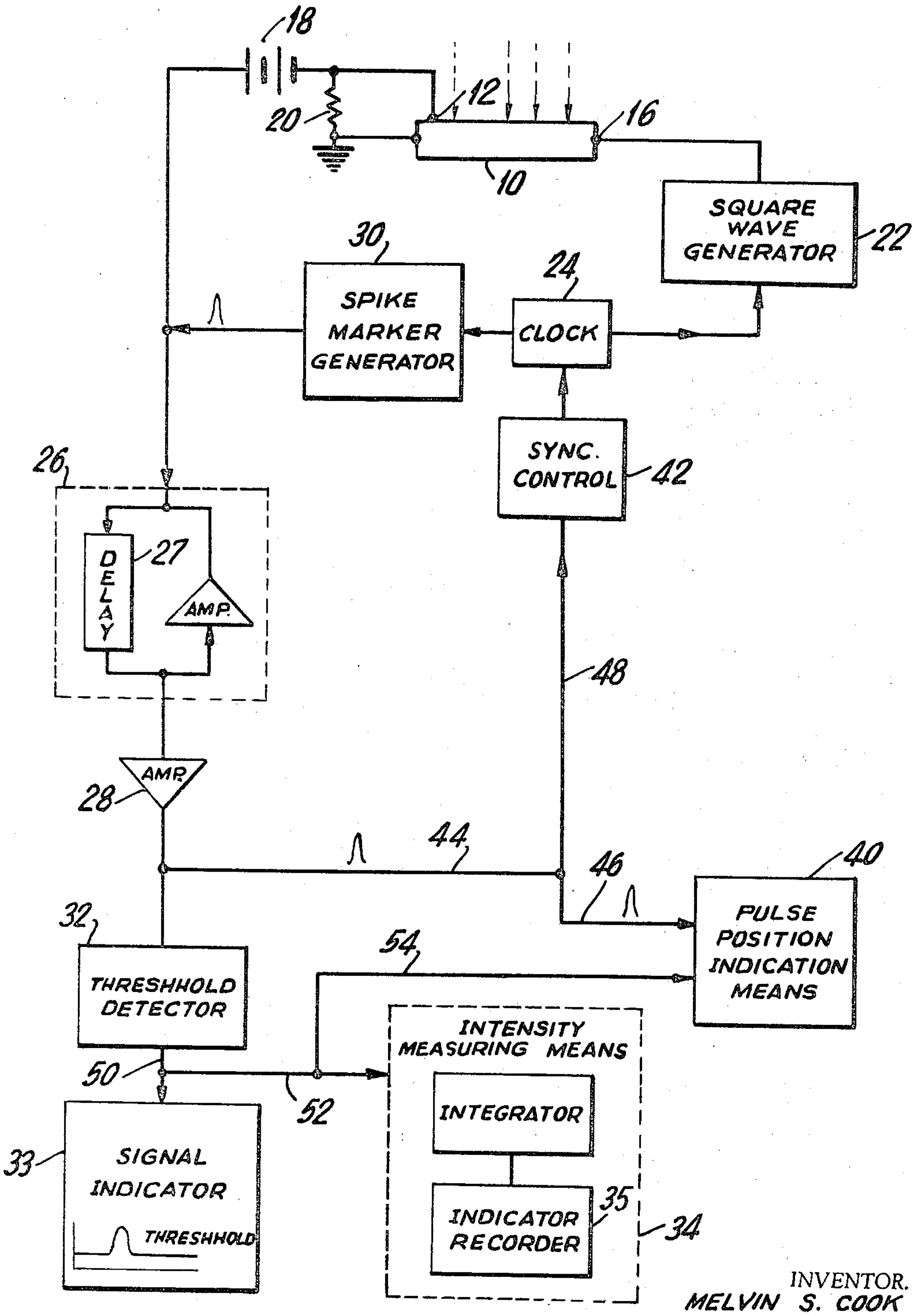

FIG. 1 shows one embodiment of the present invention which utilizes a single strip of N type semiconductor material 10 having a P type collector 12 at one end thereof and a pair of ohmic scanning contacts 14 and 16 connected to opposing ends of the strip 10. The material types cited can be reversed if desired. The PN junction formed by collector 12 and semiconductor strip 10 is normally back biased by a DC voltage source 18 which is coupled in series with a load resistor 20. Input radiation is allowed to intercept the full length of semiconductor material 10, as illustrated by the dotted lines, thus generating minority carriers along the strip 10 proportional in density to the incident radiation intensity pattern. When a positive square wave scan potential is applied to terminal 16, the minority carriers are driven across strip 10 towards electrode 14. As they pass the vicinity of the reverse biased semiconductor collector junction 12, a current proportional to the concentration of minority carriers will flow in load resistor 20 and thereby produce a varying output voltage which is related to the pattern of incident radiation on the strip 10. The square wave of voltage must be of sufficient amplitude to allow the minority carriers to travel from one end of the semiconductor strip 10 to the other before the carriers lose the information content by diffusion or are destroyed by recombination. The width of the square wave must be sufficient to allow minority carriers to move from one end of the semiconductor strip 10 to the other during one pulse.

As shown in FIG. 1, the square wave generator 22 is controlled by a clock 24. The output from generator 30 as well as the information signal derived from strip 10 are applied to recirculating delay line 26. In the particular embodiment shown, the recirculating delay line comprises a delay element and an amplifier in a feedback loop, said amplifier having a gain greater than unity. The delay element 27 may be a quartz delay line or may be of other type of delay line such as those skilled in the art may desire to use. The output from the delay line is applied to an amplifier 28. It will be understood that this output essentially comprises the information signal as well as the marker spike. The marker spike is applied over lines 44 and 48 to the control 42. In this way the spike marker controls the signal in such a way that the information signals are essentially in phase and are thus coherent as they are injected into the recirculating delay line.

The behavior of the photoconductive strip 10 is as described in U.S. Pat. No. 3,111,556. The noise generated in the photoconductive strip 10 is discussed in U.S. Pat No. 3,111,556. If we consider "noise" to be anything degrading the signal information, then most of this noise is "random" noise. However, there are "nonrandom" noise sources such as noise arising from crystal imperfection.

One function of the delay line 26 shown in FIG. 1 is to increase the signal-to-noise ratio of the voltages generated in the operation of the detector when scanned. Each time such a scan is performed, the generated voltages are fed into the delay line 26, which is of the recirculating delay line variety. The voltages derived from successive scans are fed into the delay line in such a manner that voltages generated from the same point of the strip 10 add to each other. This has the effect of increasing the signal-to-noise ratio since much of the noise is random. The amplifier 28 now sees the desired information which has thus been integrated in the delay line. The present invention thus gives a decided advantage over the prior art. Another function of this arrangement of the present invention is to pick information of interest in the incident radiation falling on the semiconductor strip 10 out of background radiation which is of a random nature. Such a function could be of interest when stellar acquisition is desired. In such case, the random nature of radiation scattered by the atmosphere onto the detector could result in a signal-to-noise ratio so low as to prevent positive identification of the radiation deriving from a star of interest. However, by successively integrating the voltages generated by scanning via the action of the recirculating delay line 26, the signal-to-noise ratio of the desired information, could be enhanced to the point where stellar acquisition is possible even where random scattered radiation has more intensity per unit area than does the information of interest. This technique of the present invention is of importance not only for stellar acquisition in guidance and navigation systems but also for the detection of such sources as missiles, rockets, or airplanes.

In summary, in the embodiment of the present invention shown in FIG. 1, a marker spike of voltage is fed into the recirculating delay line 26 from a spike marker generator 30 synchronized to the clock 24. This spike is detected coming from the delay line 26; it permits the scanning voltage generated by the square wave generator 22 to be such that the voltages generated from scanning the semiconductor strip 10 are fed properly into the delay line 26, which is preferably a nondispersive recirculating delay line. In this way, the desired information is integrated in the delay line 26 in phase.

The information output from amplifier 28 is applied to a threshold detector which allows signal to pass above the predetermined level. This signal may then be displayed or recorded in the signal indicator 33 of known types.

Figure 2:
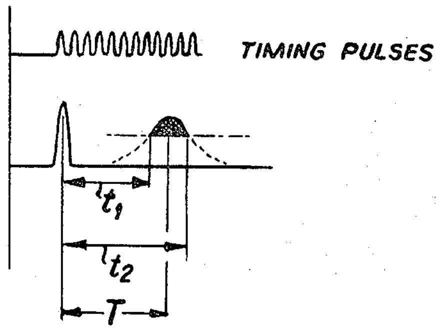
FIG. 2 is a timing diagram showing the threshold positions of the extracted signal.

The relationship between the marker spike and the signal above threshold is shown in FIG. 2.

SIGNAL LOCATION

The function of the peak detector 32 shown in FIG. 1 is to locate the pulses of valid information (signal) derived from the delay line 26. One embodiment of the peak detector would be a gate opened by a signal at a predetermined voltage threshold and which closes when the signal falls below this voltage threshold. As is clear from the discussion in U.S. Pat. No. 3,111,556, the signal measured due to point sources, such as stars or missiles, is a symmetric voltage pulse usually Gaussian. The finite bandwidth of the circuitry and materials employed may alter this signal shape somewhat, but it should remain essentially symmetric about its center. Therefore, by using the clock 24 to count time from the inception of the scan voltage or from the appearance of the marker spike until the threshold is achieved ($51$) and then until the threshold is no longer achieved ($t2$) gives a measure of the location of the signal (T) since $$T = \frac{1}{2}(t_1 + t_2).$$

It is also possible to localize the signal by differentiating the signal pulse and detecting the zero crossing of the derivative function, corresponding to the signal maximum.

The symmetrical nature of the signal and the known properties of the materials utilized also permits measure of the intensity of the valid signal falling on the semiconductor strip 10. If the signal remains Gaussian (or even if nonGaussian, if its shape as altered by the system is known) the half-width of the signal as a function of location on the semiconductor strip of the incident radiation derived from an effective point source is known and derives from the mobility and bandwidth of the semiconductor material and circuitry, respectively, as well as from other measurable phenomena. Therefore, $t1$ and $t2$ and the threshold of detection allow one to know the original signal radiation intensity. This is carried out in the embodiment shown in FIG. 1 by storing the charge between $t_1$ and $t_2$ on a capacitor, which is then discharged by a constant current generator. By measuring the time required to discharge this stored charge from the capacitor, and knowing the signal shape and width as a function of time from the appearance of the marker spike, then the required measure of signal intensity is accomplished. This measurement of signal intensity is carried out in the embodiment shown in FIG. 1 by the intensity measurer 34 there shown.

In the embodiment of FIG. 1, the output signal is applied over line 54 to pulse position indication means 40 and the spike marker is applied over line 46. The pulse position indicating means may also be explained in connection with FIGS. 2 and 3. As illustrated in FIG. 2, the time $t_1$ between the marker pulse and the time the information signal achieves threshold, and the time $t_2$, the time between the spike marker and the time the signal loses threshold may be utilized to determine T, which is a representation of the location of incident radiation.

Figure 3:
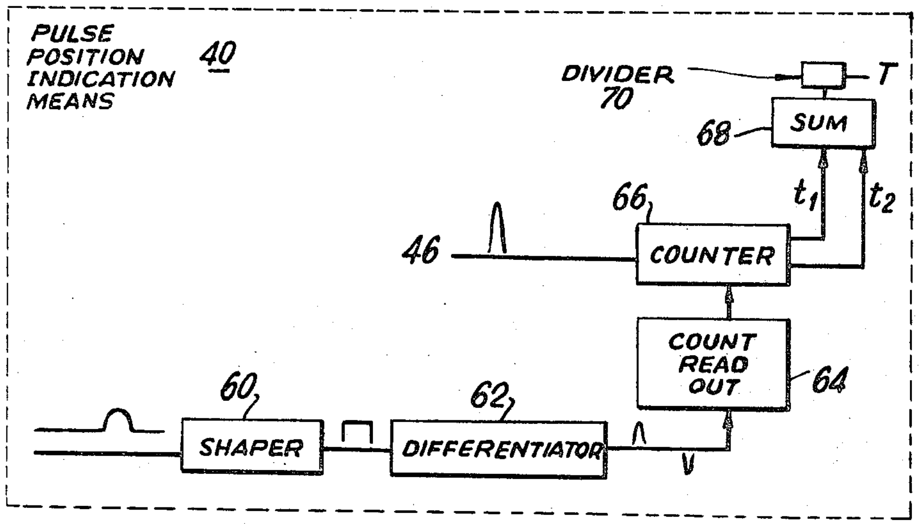
FIG. 3 is a block diagram of a signal or pulse position indication means.

In one embodiment shown in FIG. 3, the information signal is applied to a shaper 60 and a differentiator 62. The output from differentiator 62 will produce spikes corresponding to the beginning and end of threshold. A counter 66 is provided which utilizes timing pulses illustrated in FIG. 1. It is apparent that by determining the number of pulses corresponding to $t_1$ and the number of pulses corresponding to $t_2$, that the quantity T may be derived. To achieve this, the output from the differentiator 62 is applied to a count readout device which merely controls the counter to produce a signal corresponding to its then present count. For example, counter 66 will begin counting when the spike marker is applied over line 46. It will produce a first readout when the first output from a differentiator appears to provide a count corresponding to $t_1$. When the second output from the differentiator occurs, a second readout corresponding to $t_2$ will occur. These signals are then added at 68 and divided in half at 70 to provide a representation T.

Figure 4:
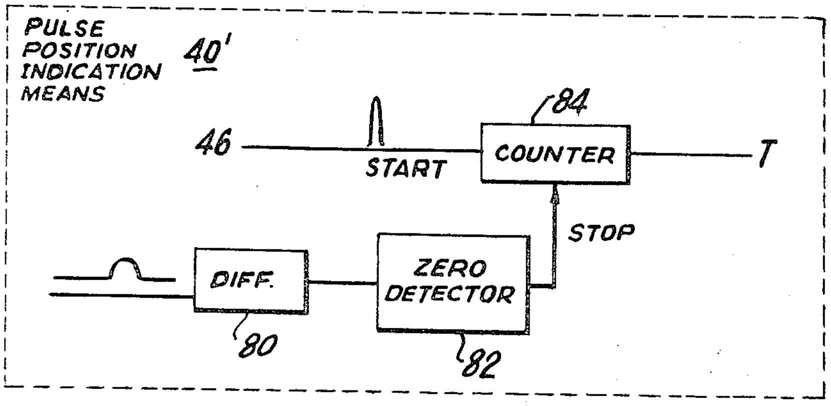
FIG. 4 is an alternate embodiment of the pulse position indication means of FIG. 3.

An alternative pulse position indication means 40' is illustrated in FIG. 4. Here, a differentiator 80 receives the information signal. It will be noted that the derivative of the information signal at its maximum point is zero. Hence the derivative signal will have a zero value at the maximum point of the signal entering the differentiator 80. A zero detector 82 will then produce a pulse in accordance with the zero crossing. In this embodiment, a counter 84 begins counting when the spike over line 46 starts operations. Counter 84 will stop upon command from the first detector. The count in 84 then is a representation of quantity T.

It will also be noted that the area comprising the information signal above threshold is a measure of the actual information signal itself. Accordingly, an intensity measuring means 34 is utilized to provide this indication. The information signal is applied over line 52 to this intensity measuring means which essentially comprises an indicator which may be a capacitor. The total charge or the integral of the current is then a measure of the intensity of the incident information signal.

The amount of charge actually stored in the capacitor may be read out by a variety of devices, all of which are shown diagrammatically as an indicator or a recorder 35.

Figure 5:
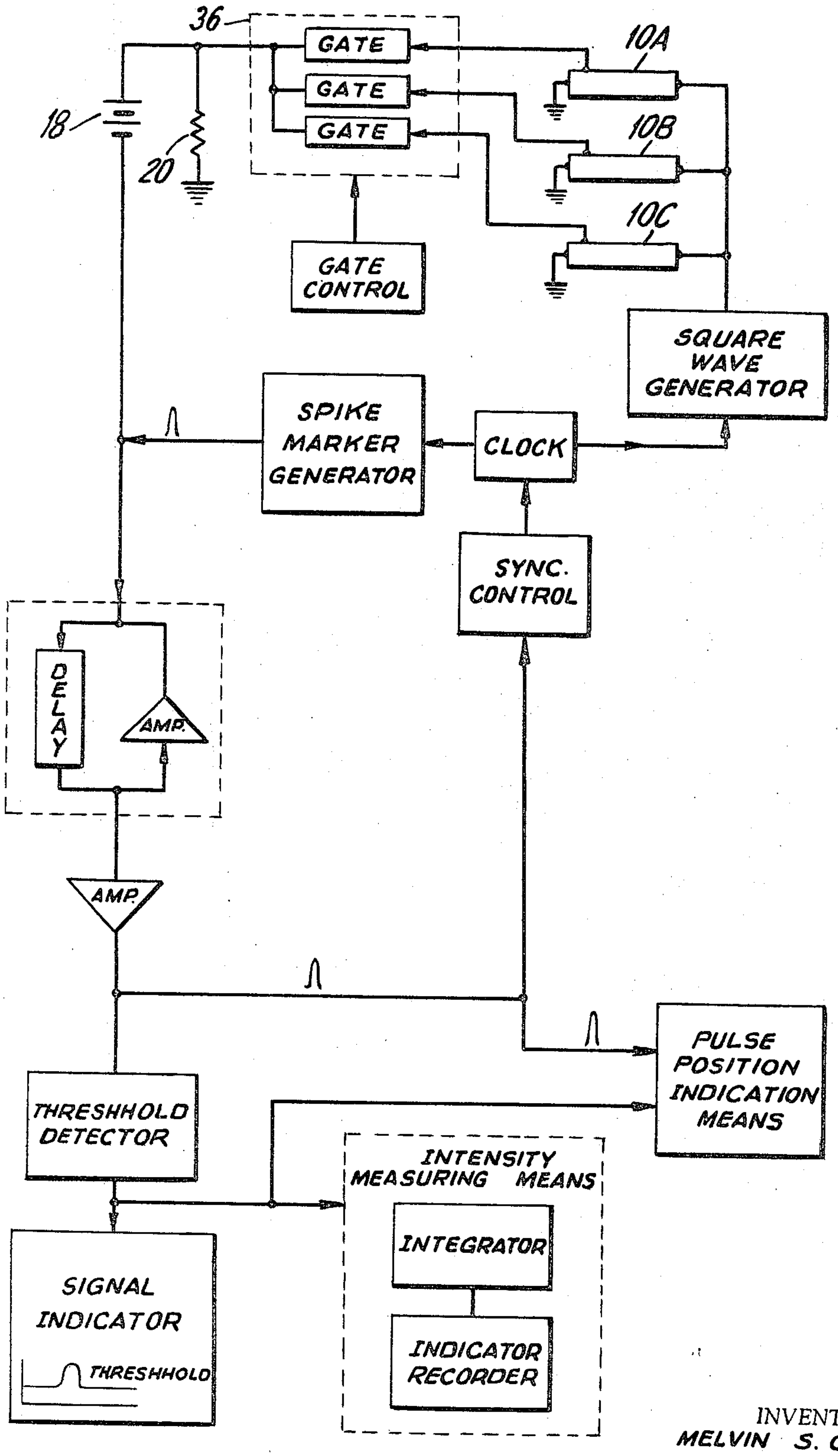
FIG. 5 is a block diagram of an alternate embodiment of the system of FIG. 1.

The embodiment shown in FIG. 5 is essentially the same as that shown in FIG. 1 with the exception that several semiconductor strips 10A, 10B, (etc.) are employed to increase the total effective detector area. A gate control 36 is employed to open and close the gates 38 in succession in order to successively scan different strips 10A, 10B, etc. As shown in FIG. 1, only a single recirculating delay line and associated circuitry is employed, but duplication is possible in order to lessen the overall time required to scan all of the strips 10A, 10B, etc.

Figure 6:
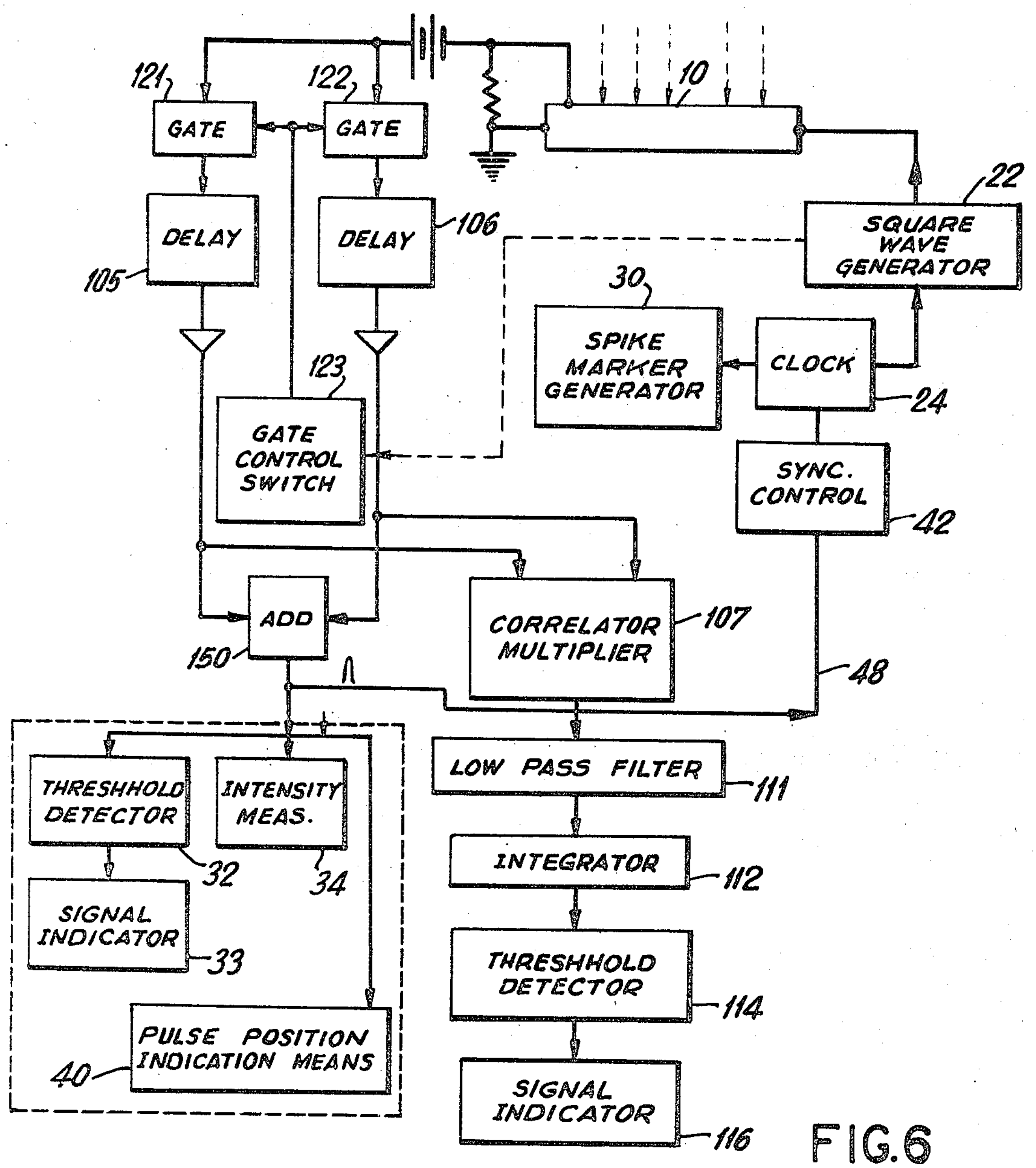
FIG. 6 is a block diagram of the preferred embodiment of this invention.

In FIG. 6, the preferred embodiment of the present invention is shown. In this embodiment, the signal developed by scanning the photosensitive semiconductor strip 2 is fed alternately into delay line 5 and delay line 6, which preferably are nondispersive recirculating delay lines. The operation of the square wave generator 1 and clock 3 are as discussed in connection with the embodiments of FIG. 1 and FIG. 5. The essential difference of the embodiment shown in FIG. 6 to the embodiments shown in FIG. 1 and FIG. 5 is the use of the correlator F in analysis of the signals generated by successively scanning the strip 2. The embodiment shown in FIG. 6 is particularly useful for detecting stellar radiation in a background of scattered solar radiation. Stellar radiation in such a background of scattered solar radiation is often buried beneath a blanket of noise generated by such scattered solar radiation.

Correlation analysis is a technique useful for determining the similarity of two different signals or determining the spectral characteristics of a signal. If one voltage, V ($t$) and another voltage $V_2$ ($t-\Xi$) where $\Xi$ is a time delay, are continuously multiplied together and the product thereby obtained fed into a low-pass filter to remove some noise pulses of random amplitude and short duration, then the output from the filter closely approximates a true mathematical correlation function.

A system that performs this integrating process will show whether correlation exists between two signals and, if so, when maximum correlation takes place.

Let us suppose that $f_1$ ($t-\Xi$) are voltages which have been fed into the nondispersive recirculating delay lines 105 and 106 respectively. In actual fact, $f_1$ (5)and $f_2$ ($t-\tau$) preferably are the result of adding into the delay lines alternatively (or successively) voltages generated by many successive scans (N) of the strip 2. This improves signal-to-noise ratio of the information in the delay lines in ratio of $\approx\sqrt{N}x(S/N)$ original. This is particularly important since we wish to increase the signal content at the expense of random noise content of $f_1$ ($t$) and $f_2$ ($t-\Xi$).

The autocorrelation function for very wideband, uniform noise with a root mean square value of $V_m$ is an impulse function at $\tau = 0$ with an amplitude $V_m^2$. This means that one characteristic of wideband noise is that the instantaneous value of the signal is completely independent of the value at any other instant and that the coherence time of the process producing the noise is very short. Thus, the cross correlation between the random noise (minus DC content) content of $f$, ($t$) and $f_2$ ($t-\tau$) approaches zero as $\Xi$ increases above the coherence time of the processes generating the random noise. If the noise voltages arise from two completely separate, unrelated processes, then the cross correlation goes to zero.

Let us consider the cross correlation of the voltages arising from the desired cross correlation information, e.g. that arising from stellar radiation incident on the strip 10. If we assume the desired information generated by scanning the strip 10 is constant in time, i.e. is not random save for possible limitations introduced by considerations such as the Heisenberg uncertainty principle, or source or detector motions, then, in effect, what we are interested in obtaining is the autocorrelation of the signal radiation falling on the strip 10. Loss in coherence between the correlation of the data obtained by scanning the carriers generated by this signal radiation is due to a certain randomness in the process of generating carriers by incident radiation. We are interested in obtaining the autocorrelation of the incident radiation signal information obtained from voltages produced by signal radiation. However, we are limited to obtaining the cross correlation of the voltages obtained from scanning carriers generated by incident radiation. The essential conclusion from the above comments is that a longer coherence time is expected for valid signal information, so that as $\tau$ is increased, the correlation of signal information goes to zero significantly less rapidly than the correlation of noise arising from random noise processes.

The system shown in FIG. 3 is designed to pay particular attention to adding generated scan voltages so that voltages generated by scanning carriers generated in the same site on the strip 10 are added together during successive scans. This, as mentioned, increases the signal-to-noise ratio of the information stored in the recirculating delay lines due to the random nature of some important noise sources.

In the embodiment of FIG. 6, the output signal from strip 10 is applied over parallel lines to provide sequential signals to parallel recirculating delay lines, the outputs of which are ultimately added at combiner 150. The output signal from strip 10 is applied over gates 121 and 122 which are opened and closed respectively, by a gate control switch 123 which may be a clock generator or other pulse producer. Gate 123 may be under the influence of the spike marker generator 30, or the square wave generator 22. Essentially only one gate is on during a particular signal. Each of the gates allows its output to be applied to the delay lines 105 and 106, respectively, of the recirculating type as previously described. The respective outputs are amplified and then combined together in a simple addition process. Further, the respective outputs from the delay lines are applied to multiplier 107 which provides the autocorrelation function. The output from adder 150 is applied to threshold detector 32, intensity measuring means 34, and pulse position indicating means 40, all of which have been described in connection with FIG. 1. The output from the adder insofar as it incorporates the spike from generator 30 is applied to sync control 42 to insure inphase operation at the delay lines. The output from correlator 107 is applied to a low pass filter 111, indicator 112. If the output from the indicator achieves threshold, it is detected at 114 and displayed at a suitable indicator 116.

Figure 7:
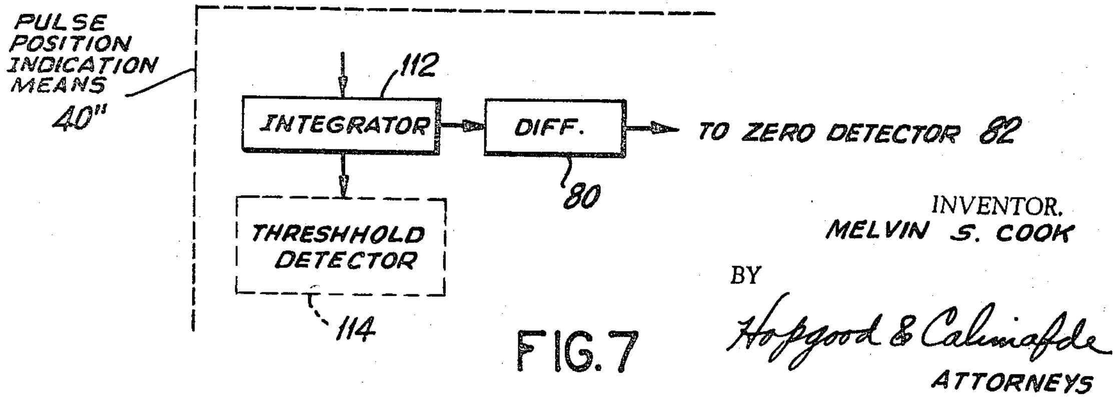
FIG. 7 is a diagram of an alternate embodiment of a pulse position indicating means which may be used with the embodiment of FIG. 6.

In FIG. 7, there is disclosed an alternative pulse position indicating means 40'' which may be utilized with the correlator aspects of FIG. 6. The output from indicator 112 may be applied to differentiator 80 which will provide a zero-crossing at maximum. This zero crossing may then be detected and utilized in accordance with the structure of FIG. 4, namely a zero detector and a counter.

The operation of the peak detector 9 can be similar to the peak detector shown in FIG. 1 and 2. However, the intensity measurer circuit 10 in the embodiment shown in FIG. 3 is different than that shown in FIG. 1 and FIG. 2 since the correlator output is obtained by multiplying $f_1$ ($t$) and $f_2$ ($t-\tau$) rather than by merely adding in scan voltages as is done in the embodiments shown in FIG. 1 and FIG. 2.

It is possible to incorporate the signal processing technique shown in FIG. 6 with a multielement photosensitive element, such as is shown incorporated in FIG. 5. Here, it is possible to switch the signal processing circuitry from one element of the sensor to another in sequence, or else to duplicate the signal processing circuitry. Further, a combination of these latter two approaches can be adopted, i.e. some duplication and some switching.

There is shown in the preferred embodiment pictured in FIG. 6 a low pass filter 111 followed by an integrator 112. This filter is not essential, but it does allow a decision to be made more quickly whether or not desired signal information is present on the strip. If the integrated value found by the integrator exceeds a certain threshold value, a signal is presumed to be incident on the semiconductor strip.

It should be pointed out that the correlation technique incorporated in the embodiment shown in FIG. 6 gives one a correlation for the signal information not dependent on the frequency stability of a mechanical slit scanning technique. Rather, in this embodiment, electronic means allow achievement of a very high accuracy in the correlation of desired signal information. This is an important advantage.

Further, both functions multiplied together in the correlator 7 have signal information localized as essentially Gaussian distributions that is similar, with peaks arriving at the correlator 7 at the time. This provides a satisfactory technique for detecting signal information. In prior art, scanning with single or multiple slits in a correlation procedure does not satisfy conditions typically which are optimum as the present invention for detection of highly localized signal information. The signal is not as well localized nor is the electric analogue of the slit pattern against which signal information is multiplied in the correlation — and which must be regulated with slit motion — as optimum in prior art as in the present invention. This is evident from the requirement that as signal information is processed by the correlator, the correlator's output should rise and decay monotonically with a central peak as narrow as possible. The noise which must be discriminated against in the present invention arises from a smaller area of the detector as opposed to prior art situations — which means the relevant noise power which must be discriminated against in the present invention is less than is the case in the prior art.

A further advantage of the present invention over the prior art lies in the increased integration time available for reception of signal information per unit time.

Angle accuracy in detection systems of the prior art is inversely related to slit width. Narrowing the slit increases angular accuracy in the prior art techniques, but reduces the signal radiation intensity passing through the lens-slit system. This limitation of the prior art is avoided in the present invention.

In the present invention, the possibility of taking a number of samples and adding them into the recirculating delay lines allows the enhancement of the signal-to-noise ration (S/N) at the expense of random noise. This sampling is followed by multiplication in the correlator. Clearly, for nondispersive delay lines, the noise of significance in localizing a signal is solely that arising in the same region of the sensor where the signal radiation is incident. This is a definite advantage of the present invention over the prior art, where larger areas of noise generation must be accepted.

Detecting the output of the correlator of the functions $f_1(5)$ and $f_2(t-\tau)$ gives a sharper signal that is further above the chosen threshold and of reduced half-width. Therefore, this signal can be more accurately localized. This tends to increase the accuracy of localization of desired signal information.

A representative scan time would be 10 microseconds. A square wave scan voltage wave train could have positive pulses 10 microseconds long with 10 microsecond interval between scan voltage pulses. These values are intended to be representative, but not restrictive in any sense. In any particular case, an actual choice would be based on the properties of the semiconductor material and the other requirements of the system.

One consideration of significance is the setting of the threshold level for the decision whether or not the correlation function leaving the correlator, when integrated, contains signal information or not. This involves optimizing the voltage pedestal of the collector on the photosensitive convenient obtain some information about the intensity of the random noise due to such noise sources as scattered solar radiation incident on the sensor—the random noise generated thermally and by other means in the system itself (exclusive of noise due to incident radiation) being normally reasonably well defined. The level of the threshold chosen would take these factors into consideration in any given application.

Some of the advantages of the foregoing invention are:

1. Better localization of signal information.
2. Better measurement of signal amplitude.
3. Enhancement of signal to noise properties.
4. Elimination of mechanical slit scanning.

5. Capability of high speed operation.
6. Utilization of wide aperture optics without sacrifice of resolving powers.
7. Elimination of some of the dead areas found in a mosaic type of detector.

While the principles of the invention have been described in connection with specific apparatus, it is to be clearly understood that this description is made only by way of example and not as a limitation to the scope of the invention as set forth in the objects thereof and in the accompanying claims.

I claim:

1. A signal detection and scanning device comprising a semiconductor material adapted to receive an input signal, said semiconductor material being adapted to release free carriers in response to said input signal, collector means attached to said semiconductor material and means for applying a scanning voltage to said semiconductor material to drive said free carriers toward said collector means, recirculating delay line means, means to apply the output signals from said collector means to said recirculating delay line means to coherently combine said signals, said scanning means including synchronizing scanning voltage means to control the time of scanning of said material in synchronized response to the output from said delay line means.

2. The device of claim 1 including threshold detecting means coupled to the output from said delay line means.

3. The device of claim 2 including means for locating the position of the input radiation on said material including means to determine the time of the maximum of the output signal from said delay line means.

4. The device of claim 3 including means to determine the time from the beginning of scan to both the time of beginning of the output from said threshold detecting means and the time of cessation of output therefrom.

5. The device of claim 4 including courtesy means responsive to the beginning of said scanning voltage.

6. The device of claim 1 including means to autocorrelate the output from said delay line means.

7. The device of claim 6 in which said autocorrelating means includes a plurality of delay lines, means responsive to the output of said delay lines to multiply and integrate the multiplied output thereof.

8. The device of claim 1 in which the synchronized scanning voltage means includes clock pulse producing means.

9. The device of claim 8 in which the means to apply output signals includes synchronized means responsive to said clock pulse producing means.

10. The device of claim 1 in which the scanning voltage applied to said material has an amplitude sufficient to allow the minority carriers to travel to said collector means.

11. A radiation detection and scanning device comprising a semiconductor material adapted to receive input radiation, said semiconductor material being adapted to release free carriers in response to said input radiation, collector means attached to said semiconductor material and means for applying a scanning voltage to said semiconductor material to drive said free carriers toward said collector means, recirculating delay line means, means to apply the output signals from said collector means to said recirculating delay line means to coherently combine said signals, said scanning means including synchronizing scanning voltage means to control the time of scanning of said material in synchronized response to the output from said delay line means.